(12) United States Patent
Costa et al.

(10) Patent No.: US 7,900,188 B2
(45) Date of Patent: Mar. 1, 2011

(54) SPECIFYING IMPLEMENTATIONS OF CODE FOR CODE GENERATION FROM A MODEL

(75) Inventors: Paul Costa, Berkley, MA (US); Brian K. Ogilvie, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 1185 days.

(21) Appl. No.: 11/514,818

(22) Filed: Sep. 1, 2006

(65) Prior Publication Data

US 2008/0127057 A1 May 29, 2008

(51) Int. Cl.
*G06F 9/44* (2006.01)
*G06F 9/45* (2006.01)

(52) U.S. Cl. ................. 717/106; 717/113; 717/115

(58) Field of Classification Search ......... 717/104–109, 717/123–125, 136–137, 113–115, 146
See application file for complete search history.

(56) References Cited

U.S. PATENT DOCUMENTS

| | | | | |
|---|---|---|---|---|
| 5,421,016 | A * | 5/1995 | Conner et al. | 717/146 |
| 5,668,998 | A * | 9/1997 | Mason et al. | 717/104 |
| 6,094,528 | A * | 7/2000 | Jordan | 717/115 |
| 6,269,473 | B1 * | 7/2001 | Freed et al. | 717/104 |
| 6,272,672 | B1 * | 8/2001 | Conway | 717/107 |
| 6,401,237 | B1 * | 6/2002 | Ishikawa | 717/113 |
| 6,560,774 | B1 * | 5/2003 | Gordon et al. | 717/146 |
| 6,754,885 | B1 * | 6/2004 | Dardinski et al. | 717/113 |
| 6,996,800 | B2 * | 2/2006 | Lucassen et al. | 717/106 |
| 7,047,518 | B2 * | 5/2006 | Little et al. | 717/108 |
| 7,086,047 | B1 * | 8/2006 | Edwards et al. | 717/160 |
| 7,216,332 | B2 * | 5/2007 | Smith | 717/106 |
| 7,219,328 | B2 * | 5/2007 | Schloegel et al. | 717/104 |
| 7,392,509 | B2 * | 6/2008 | Sinha et al. | 717/126 |
| 7,493,594 | B2 * | 2/2009 | Shenfield et al. | 717/107 |
| 7,500,220 | B1 * | 3/2009 | Feng et al. | 717/106 |
| 7,631,290 | B1 * | 12/2009 | Reid et al. | 717/105 |
| 7,676,786 | B2 * | 3/2010 | Shenfield et al. | 717/104 |
| 7,689,969 | B1 * | 3/2010 | Wendling | 717/105 |
| 2004/0044990 | A1 | 3/2004 | Schloegel et al. | |
| 2005/0177816 | A1 | 8/2005 | Kudukoli et al. | |

FOREIGN PATENT DOCUMENTS

WO    WO-2006/065283 A1    6/2006

OTHER PUBLICATIONS

Mayer et al, "Evaluating models for model based debugging", IEEE, pp. 128-137, 2008.*

(Continued)

*Primary Examiner*—Anil Khatri
(74) *Attorney, Agent, or Firm*—Nelson Mullins Riley & Scarborough; Kevin J. Canning

(57) ABSTRACT

Embodiments of the present invention allow user to generate a model in a modeling environment and to generate code from the model using various implementations of code for portions of the model. The implementations of code can be supplied by the modeling environment or supplied by a user. Embodiments further allow a user to specify a scope in a model such that portions of the model contained in the scope use a specific implementation or implementations of code.

21 Claims, 14 Drawing Sheets

OTHER PUBLICATIONS

Edwards et al, "Efficient code generation from SHIM models", ACM LCTES, pp. 125-134, 2006.*

Anand et al, "Distributed code generation from hybrid systems models for time delayed multirate systems", ACM EMSOFT, pp. 210-213, 2005.*

Lopez et al, "Behavioral modeling and simulation of sum delta modulator using hardware description languages", IEEE Date, pp. 1-6, 2003.*

European Office Action for Application No. 07837681.1, dated Jul. 5, 2010.

* cited by examiner

SPECIFYING IMPLEMENTATIONS OF CODE FOR CODE GENERATION FROM A MODEL

FIELD OF THE INVENTION

Various embodiments of the present invention are related to generating code from a model. More specifically, embodiments of the present invention are related to generating code using specified implementations of code that correspond to a portion of the model.

BACKGROUND

Various modeling environments, both textual and graphical, can automatically produce either deployable software systems or descriptions of hardware systems that mimic the behavior of either the entire model or portions of the model. Such production of code from a model is often referred to as "code generation".

For example, a graphical modeling environment, such as Simulink® from The MathWorks, Inc. of Natick, Mass., caters to various aspects of dynamic system simulation, analysis and design. Simulink® allows users to perform numerous types of tasks including constructing system models through a user-interface for drafting block diagram models, allowing augmentation of a pre-defined set of blocks with custom user-specified blocks, using the block diagram model to compute and trace the temporal evolution of the dynamic system ("executing" the block diagram), and generating code from the model.

Typically, these modeling environments use a single implementation of code during the code generation process and do not allow a user to customize the code based on the availability of multiple implementations of code for a portion of the model or the entire model. As a result, the code that is generated from the code generation process can be insufficient for many applications where specific design requirements need to be met.

It, therefore, is desirable to provide a user with multiple implementations of code for a portion of a model and to allow the user to specify which implementation of code should be used for code generation. Likewise, it is also desirable to allow a user to supply implementations of code for an element in a model, thereby allowing a user to further customize the code that is generated during the code generation process.

SUMMARY OF THE INVENTION

Embodiments of the present invention allow user to generate a model in a modeling environment and to generate code from the model using various implementations of code. The implementations of code can be supplied by the modeling environment or can be supplied by a user and can be used to generate code that achieves certain performance or design characteristics. Embodiments of the present invention further allow specific implementations of code to be used based on a scope that a user specifies. The specified scope, for example, can be related to a region of the model or can encompass the entire model, such that all elements contained in the region of the model can be specified to use implementations of code that meet the same performance or design requirement. The specified scope can also be, for example, related to the types of elements in the model or in a region of the model, such that the specified type of element uses the same implementation of code is specified for each element.

In one aspect, a method in a computing device is disclosed that includes the step of providing a model. The method also includes the steps of providing a first implementation of code that corresponds to a first portion of the model, and providing a second implementation of code that corresponds to the first portion of the model. The method further includes the step of generating code for the model. A section of the generated code that corresponds to the first portion of the model uses one of the first or second implementations of code.

In another aspect, a computing system is disclosed that includes a model, a first implementation of code, a second implementation of code and a code generator. The first and second implementations of code correspond to a first portion of the model. The code generator generates code for the model. A section of the code that corresponds to the first portion of the model uses one of the first or second implementations of code.

In yet another aspect, a medium for use on a computing device that holds instructions that are executable using the computing device is disclosed. The instructions enable the steps of obtaining a model, obtaining a first implementation of code that corresponds to a first portion of the model, and obtaining a second implementation of code that corresponds to the first portion of the model. The instructions also enable the step of generating code for the model. A section of code that corresponds to the first portion of the model uses one of the first or second implementations of code.

In still another aspect, a method in a computing device is disclosed. The method includes the steps of providing a user interface for selecting implementations of code for at least a portion of a model, and representing at least one implementation of code using a designation. The method further includes the step of receiving a selection of an implementation of code for a first portion of the model and generating code that uses the implementation of code that is selected.

In an additional aspect a computing system is disclosed that includes a user interface. The user interface allows for the selection of implementations of code for portions of a model. At least one implementation of code in the user interface is represented by a designation.

In a further aspect, a medium for use on a computing device that holds instructions that are executable using the computing device is disclosed. The instructions enable the steps of obtaining a user interface for selecting implementations of code for at least a portion of a model, and representing at least one implementation of code using a designation. The instructions further enable the steps of receiving a selection of an implementation of code for a first portion of the model and generating code that uses the implementation of code that is selected.

In still another aspect, a method in a computing device is disclosed that includes the step of providing a model. The method also includes the steps of providing a first implementation of code that corresponds to a first portion of the model and providing a second implementation of code that corresponds to the first portion of the model. The method further includes the step of programmatically selecting one of the first or second implementations of code based on a given constraint. The method also includes the step of generating code for the model. A section of code that corresponds to the first portion of the model uses one of the automatically selected first or second implementations of code.

In an additional aspect, a medium for use on a computing device that holds instructions that are executable using the computing device is disclosed. The instructions enable that steps of obtaining a model, obtaining a first implementation of code that corresponds to a first portion of the model, and obtaining a second implementation of code that corresponds to the first portion of the model. The instructions further enable the steps of programmatically selecting one of the first or second implementations of code based on a given constraint, and generating code for the model. A section of code that corresponds to the first portion of the model uses one of the automatically selected first or second implementations of code.

In another aspect, a method for supplying a user with an implementation of code that corresponds to an element for use in a model is disclosed. The method includes the step of providing an implementation of code that corresponds to an element for use in a model. The implementation of code that is provided is capable of being used in a code generation process where code is generated to represent elements in a model. The method further includes the step of supplying the implementation of code to the user for a fee where the implementation of code is specified to satisfy a performance characteristic.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
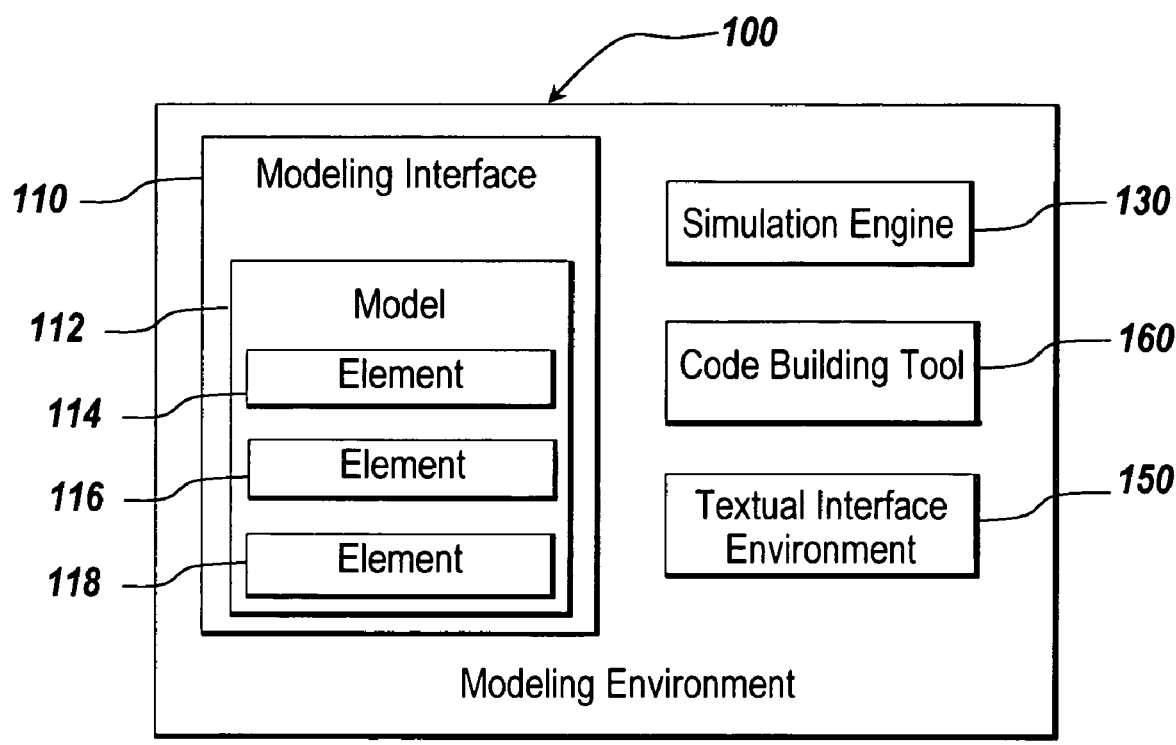
FIG. 1 depicts a high-level block diagram of an exemplary graphical modeling environment that may be used for implementing various embodiments of the present invention.

Embodiments of the present invention allow a user to generate a model in a modeling environment and to generate code from the model. The generated code can be represented in a hardware description language, such VHDL (very high speed integrated circuit hardware description language) or Verilog, or in a programming language, such as the C, C++ or JAVA™ programming languages. The model can be represented as a graphical model in a graphical modeling environment, such as Simulink® from The MathWorks, Inc of Natick Mass. or UML™ (unified modeling language), or any of a number of graphical modeling environments. Alternatively, the model can be represented as a textual model in a textual modeling environment, such as MATLAB® from The MathWorks, Inc.

Embodiments of the present invention provide implementations of code that correspond to associated portions of a model to allow a user to customize the code generated from the model. For example, an implementation of code can be specified for an element in a model, a part of an element in model, multiple elements in a model, algorithmic aspects in a model, etc. An implementation of code, as referred to herein, can represent a fragment of code in a programming language, such as C, C++, the JAVA™ programming language, the JAVASCRIPT™ scripting language, etc., or in a hardware description language, such as VHDL or Verilog. An implementation of code may also be represented by a high level abstraction of code, such as an intermediate representation. An implementation of code that is represented as an intermediate representation, such as, for example, a control flow or data flow graph, can include language specific syntax or may be in a non-language specific syntax. An implementation of code can represent a "template", such that the implementation of code can provide a basic structure and syntax, but requires additional data or code to completely represent a portion of a model. As an example, an implementation of code may provide a template such that either fixed point or floating point values can be instantiated. This allows a user to use an implementation of code for various purposes. An element, as referred to herein, can be a segment of text or a graphical affordance, and can represent algorithmic aspects of a model. The implementations of code may allow a user to generate code that achieves certain performance or design characteristics. Each portion of a model can have multiple corresponding implementations of code that are each developed to meet various performance or design requirements.

A user interface can be provided that allows a user to develop implementations of code that can be used in the code generation process. In this manner, a user can provide user-developed implementations of code that are directed to unique aspects or requirements of the user's model.

Embodiments of the present invention further allow a user to specify a scope of elements in a model to use specific implementations of code. The specified scope can, for example, be related to a region of the model, types of elements in the model, parts of an element in the model or the entire model.

Embodiments also may allow a user to purchase additional implementations from a vendor for a fee. The additional implementation can provide, for example, specialized implementations of code or implementations of code that achieve better performance than implementations of code that are provided without additional cost (i.e., built into the tool).

FIG. 1 is a high-level block diagram of the modeling environment 100 for modeling, simulating, and analyzing dynamic systems. The modeling environment 100 may include a modeling interface 110, a simulation engine 130, a textual interface 150, and a code building tool 160.

The modeling environment 100 allows a user to develop models in the modeling interface 110. Using the modeling interface 110, a user can create a model 112 that includes, for example, an element 114, an element 116 and an element 118. The elements can be, for example, graphical objects or textual objects that model a system, such as a dynamic system. The user may use predefined elements or user-specified elements to develop a model.

The textual interface 150 may allow a user to develop a user-defined element with a sequence of commands in a textual language. The textual interface 150 can also facilitate debugging and/or profiling of a model. Alternatively, implementations of the modeling environment 100 may include a separate debugger and profiler.

The simulation engine 130 may communicate with the modeling interface 110. The simulation engine 130 can receive a model such as, for example, a block diagram model, a state diagram model, a UML model, a text-based model (e.g., a sequence of commands), etc., that is generated using the modeling interface 110. The simulation engine 130 can convert the model created in the modeling interface 110 to an executable form, referred to as a compiled model. The simulation engine 130 can repetitively execute the compiled model e.g., via successive time steps from a simulation start time to a stop time specified by the user or until the simulation is interrupted. Alternatively, the simulation engine 130 may enable interpretive simulation of the model.

The code building tool 160 can be used to generate code, such as source code, object code, a compiled executable or library for forming an executable of a model provided by the modeling interface 110. The code building tool 160 can also be used to generate a hardware description language representation of the model. The code building tool uses implementations of code for portions of a model to generate executable code, instructions, etc. in a programming language such as Java, Javascript, C or C++ or a hardware description language such as Verilog or VHDL. To generate code the code building tool can convert a source model language representation of a model to a target language. The code building tool 160 may comprise an extended version of a code building tool such as Real-Time Workshop® from The MathWorks, Inc. of Natick, Mass. or any portion thereof, or may be substantially any software component for generating executable code, instructions, etc., in a programming language such as Java or C or in a hardware description language such as Verilog or VHDL.

The code building tool 160 can generate source code for the execution of a model that is provided by the modeling interface 110, and can compile the source code into object code and build an executable program, library or substantially any other form of executable instructions. The code may be designed to run on any processor, microprocessor, dual-core processor, multi-core processor, cluster of processors, operating system, computational hardware device, component of a computational hardware device, etc. In one embodiment, the code may comprise embedded code targeted to run on an embedded system. Additionally, the code can be customized to run on a specific target hardware platform. For example, the code generated may include fixed-point code to run a fixed-point processor or code can be generated to emulate fixed-point behavior on a floating-point processor.

One of ordinary skill in the art will also appreciate that the components of the modeling environment 100 may be provided on the same computing device, as described below with reference to FIG. 2, or alternatively, the components of the modeling environment 100 may be coupled to each other via a communication network, as described below with reference to FIG. 3.

Figure 2:
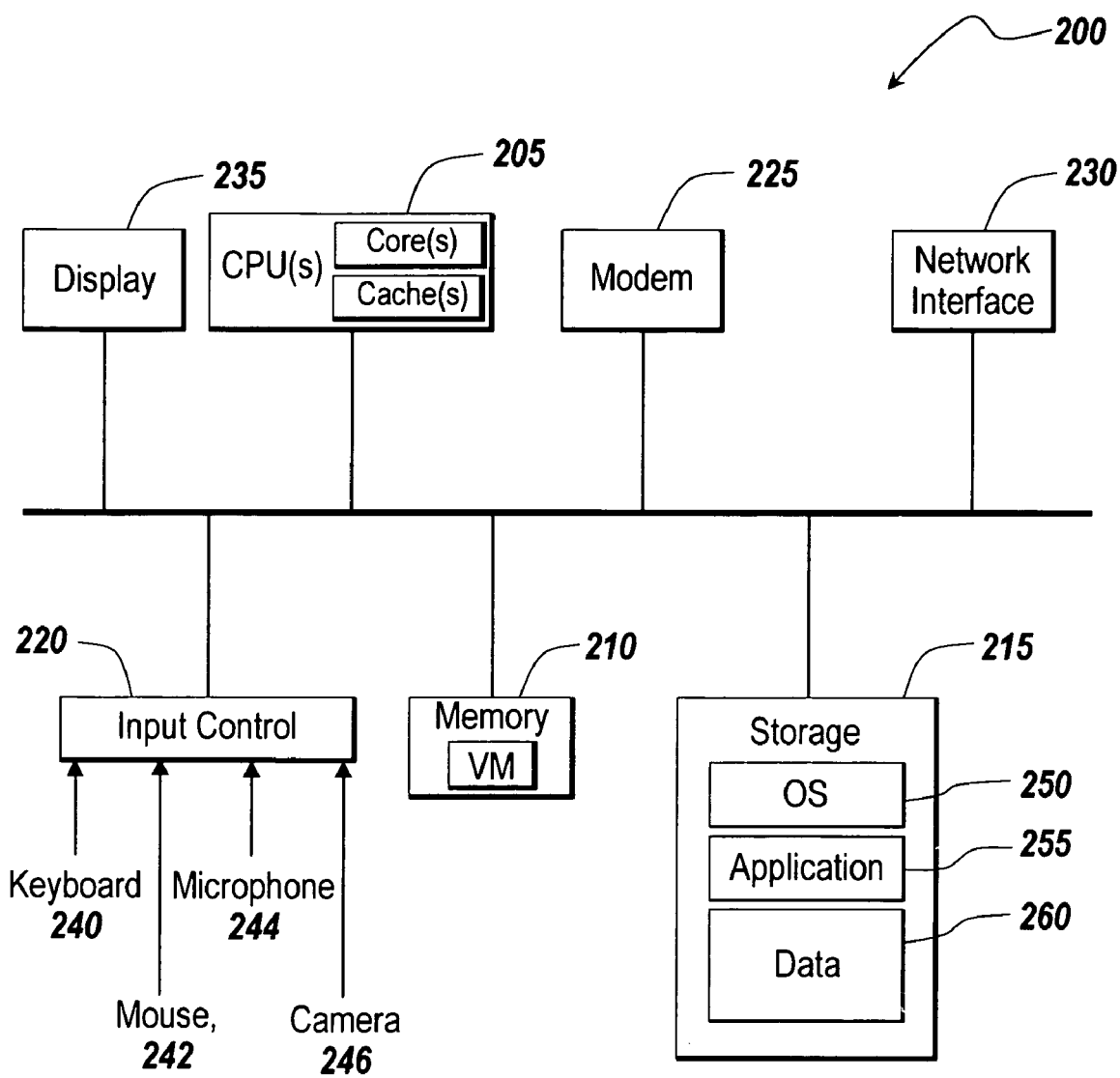
FIG. 2 depicts an exemplary computing device suitable for practicing the illustrative embodiment of the present invention

FIG. 2 is an exemplary computing device 200 suitable for practicing the illustrative embodiment of the present invention. One of ordinary skill in the art will appreciate that the computing device 200 is intended to be illustrative and not limiting of the present invention. The computing device 200 may take many forms, including but not limited to a personal computer, workstation, server, network computer, quantum computer, optical computer, bio computer, Internet appliance, mobile device, a pager, a tablet computer, and the like.

The computing device 200 may be electronic and may include a Central Processing Unit (CPU) 205, memory 210, storage 215, an input control 220, a modem 225, a network interface 230, a display 235, etc. The CPU 205 may control each component of the computing device 200 to provide the modeling environment 110, simulation engine 130, textual interface environment 150, and/or code building tool 160. The memory 210 temporarily stores instructions and data and provides them to the CPU 205 so that the CPU 205 operates the computing device 200 and may run the modeling environment 110, simulation engine 130, textual interface environment 150, and/or code building tool 160, based on the stored instructions.

Optionally, the computing device 200 may include multiple CPUs for executing software loaded in the memory 210, and other programs for controlling system hardware. Each of the CPUs can be a single or a multiple core processor. The code loaded in the memory 210 may run in a virtualized environment, such as in a Virtual Machine (VM). Multiple VMs may be resident on a single processor. Also, part of the application could be run in hardware, for example, by configuring a field programmable gate array (FPGA), using an application specific instruction set processor (ASIP) or creating an application specific integrated circuit (ASIC). Further, the part of the applications may be run on analog electronic devices or other resources may be used to run part of the application, such as graphics processing units (GPUs) or dedicated hardware such as Fast Fourier Transform (FFT) processing blocks.

The storage 215 may contain software tools for applications. The storage 215 can include code 250 for the operating system (OS) of the device 200, code 255 for applications running on the operation system including the applications for the modeling environment 110, simulation engine 130, textual interface environment 150, code building tool 160 and data 260 generated from the modeling environment 110, simulation engine 130, textual interface environment 150, and code building tool 160. Those of ordinary skill in the art will appreciate that parts of the applications can be stored in the CPU cache or memory 210 as well, much like the data, and even the OS, or they can be stored on the network described below with reference to FIG. 3.

The input control 220 may interface with a keyboard 240, a mouse 242, a microphone 244, a camera 246, such as a web camera, or other input devices. The computing device 200 may receive, through the input control 220, input data, such as the input data for developing a model. The computing device 200 may display on the display 235 user interfaces for displaying the data generated from the modeling environment 110, simulation engine 130, textual interface environment 150, and code building tool 160.

Figure 3:
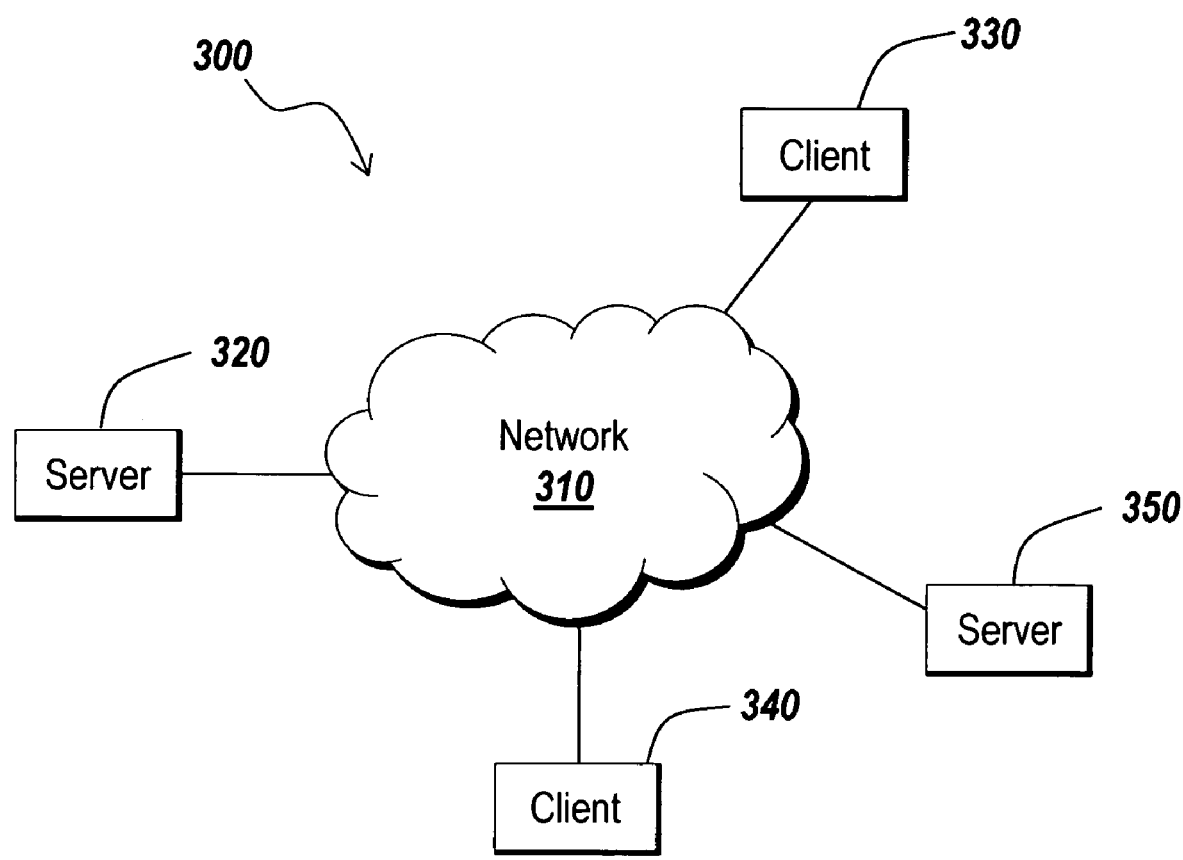
FIG. 3 depicts an exemplary distributed system suitable for practicing a distributed implementation of an illustrative embodiment.

FIG. 3 is an exemplary network environment 300 suitable for the distributed implementation of the illustrative embodiment. The network environment 300 may include one or more servers 320 and 350 coupled to clients 330 and 340 via a communication network 310. The network interface 230 and the modem 225 of the computing device 200 enable the servers 320 and 350 to communicate with the clients 330 and 340 through the communication network 310. The communication network 310 may include Internet, intranet, LAN (Local Area Network), WAN (Wide Area Network), MAN (Metropolitan Area Network), wireless network (e.g., using IEEE 802.11 and Bluetooth), etc. In addition the network may use middleware, such as CORBA (Common Object Request Broker Architecture) or DCOM (Distributed Component Object Model) to allow a computer on the network to communicate directly with another computer or device that is connected to the network. The communication facilities can support the distributed implementations of the present invention.

In the network environment 300, the servers 320 and 350 may provide the clients 330 and 340 with software components or products under a particular condition, such as a license agreement. The software components or products may include those for providing the modeling environment 110 and/or implementations of code for select elements. The software components or products may also include those for the simulation engine 130, textual interface environment 150, and code building tool 160 coupled to the modeling environment 110.

In one example, the client 340 may perform the modeling of a dynamic system using a software component provided by the server 320 and send the server 320 the model for simulation. The server 320 may return the simulation results to the client 340 and the client 340 may subsequently display the data to the user with the information on the data.

In another example, the client 340 may have the modeling environment 100 and may desire additional implementations of code for select models. The client 340 may have implementations of code that are already loaded on the client 340 or may have to download each implementation of code the client 340 desires. In either case, the server 320 may store implementations of code that the user can download. The user may be charged a fee to download the implementation of code. The implementation of code may be specialized code that provides an advantage over an implementation of code the client 340 already has.

In another example, the client 340 can access the server 320 and/or 350 to access a repository of implementations of code. The implementations of code in the repository can be maintained and updated by an administrator. The repository can serve as a central location to access implementations of code for the clients 330 and 340. The clients may also be able to upload implementations of code to the repository. Alternatively, the clients 330 and 340 can access the repository of implementations of code via a network such as the Internet to download or upload implementations of code. The implementations of code may be put under version control in the repository and may have information as well as index terms associated with them. The information can be text or any other format for information storage such as the eXtended Markup Language (XML).

Figure 4A:
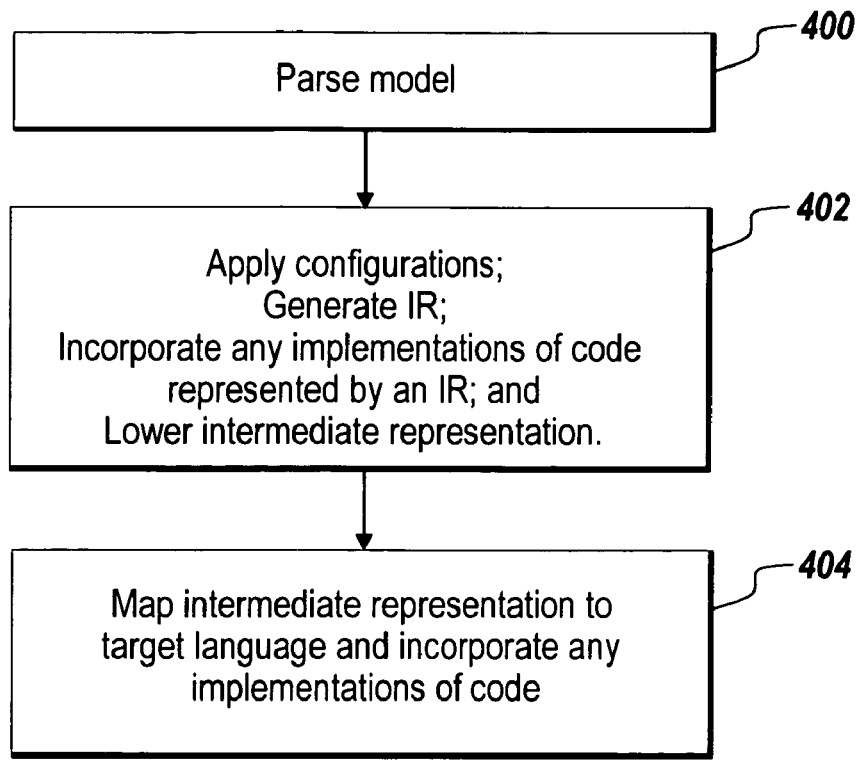
FIG. 4A is a flow diagram that depicts exemplary steps for generating code for a model according to an illustrative embodiment.

FIG. 4A is a flow diagram that provides an example of steps for generating the code for a model. In one example, to generate code after the selection of implementations of code is complete, the code building tool 160 parses the model into syntactical components (step 400). Subsequently, embodiments of the present invention may apply code configurations, construct an intermediate representation (IR) and may lower the IR (step 402). In some embodiments, a selected implementation of code may represent an IR. The implementation of code that is represented by the IR may be incorporated into the IR that is constructed in step 402. Likewise in some embodiments, a selected implementation of code may be represented in a programming language or a hardware description language. An implementation of code of this type may be incorporated by the process in a later step. The order of the processing performed in step 402 may vary. For example, an intermediate representation may be constructed and lowered and then the code configurations can be applied. Code configurations can be applied to portions of the model or to the entire model. The intermediate representation can be, for example, a control flow graph or a data flow graph. The intermediate representation may be lowered into an intermediate representation that provides non-language specific and primitive constructs that may be used by many different languages, such as C, C++, VHDL or Verilog or the intermediate representation may be lowered into an intermediate representation that provides specific language and constructs that are directed to a specific language. The code is then generated by mapping the syntax and semantics of the intermediate representation to the syntax and semantics of the target language, and any specified implementations of code that are represented by a programming language or a-hardware description language are incorporated into the code (step 404).

In some instances, a user may not specify implementations of code for all portions of the model. In this case, the modeling environment 100 may propagate a selected implementation of code from one portion of the model to another portion of a model. For example, the user may specify an implementation of code for a first portion of model that maximizes the speed of execution for that portion, but may not specify an implementation of code for a second portion of the model that is connected to the first portion of the model. The implementation of code specified for the first portion of the model may propagate to the second portion of the mode, such that if the second portion of the model has an implementation of code that corresponds to maximizing the execution speed, the modeling environment can select that implementation of code for the second portion of the model.

Figure 4B:
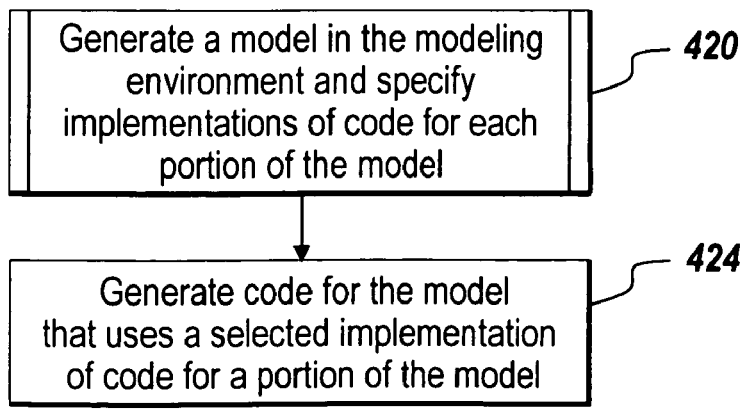
FIG. 4B is a flow diagram that provides exemplary steps for incorporating implementations of code into generated code of a model.

FIG. 4B is a flow diagram that depicts an example of steps for generating code for a model using implementation options for the code. A user can generate a model in the modeling environment 100 and can specify implementations of code for each portion of the model during or after the model is generated (step 420). The modeling environment 100 can retrieve available implementations of code that correspond to the portions of the model from a database. The user can generate code for the model that uses selected implementations of code for portions of the model (step 424). The code that is generated can be represented in a programming language, such as C, C++ or JAVA™ programming language, or in a hardware description language, such as VHDL or Verilog.

Each portion of the model can have multiple implementations of code. For example, an algorithm in the model may have five implementations of code that can be used for code generation and the user can specify which implementation of code to use. The implementations of code can be directed to various performance characteristics or requirements, such a power reduction, memory size reduction, increased speed, reduction of stack usage, etc. In one instance, the user may want to minimize the amount of power required when the generated code is implemented on a target device. For example, the user can generate a HDL representation of the model that the user desires to implement on, for example, an FPGA, and the user can specify implementations of code for one, multiple or all of the elements in the model. Each specified implementation may be directed towards the same performance characteristics, such as, minimizing power when the code is implemented on a target device or each implementation of code that is specified may be directed at various performance characteristics. For example, the user may specify that a portion of the model use an implementation of code that minimizes power and may specify that another portion of the model use an implementation of code that increases the speed in which the other portion of the model executes.

Further, a selection of implementations for a given portion of a model may vary depending on the target device for the code or for a target language of the generated code. In one example, one set of implementations of code may be available when the user intends to implement the code on a FPGA with one set of constraints and another set of implementations of code may be available if the user intends to implement the code on a FPGA with a different set of constraints. The selection of implementations of code that is provided may correspond to the available resources of a target device.

In addition, the selection of implementations that are available may correspond to the type of code that the user intends to create. In one example, one set of implementations may be available for a VHDL representation and another set of implementations may be available for a Verilog representation, while yet another selection may be available for a C, C++, JAVASCRIPT™ scripting language, or JAVA™ programming language representation. In this manner, the user can specify which hardware description language or programming language to use and the selection of implementations of code for the specified hardware description language can be provided to the user. In yet another example, one set of implementations of code may be available for a fixed point code implementation and another set of implementations may be available for a floating point code implementation.

In another example, one set on implementations of code may be available for an instrumented implementation and another set of implementations may be available for a non-instrumented implementation. The instrumented implementations can allow a user to test, verify and/or debug the generated code, while the non-instrumented implementations can be provided for a product that uses the generated code.

Figure 4C:
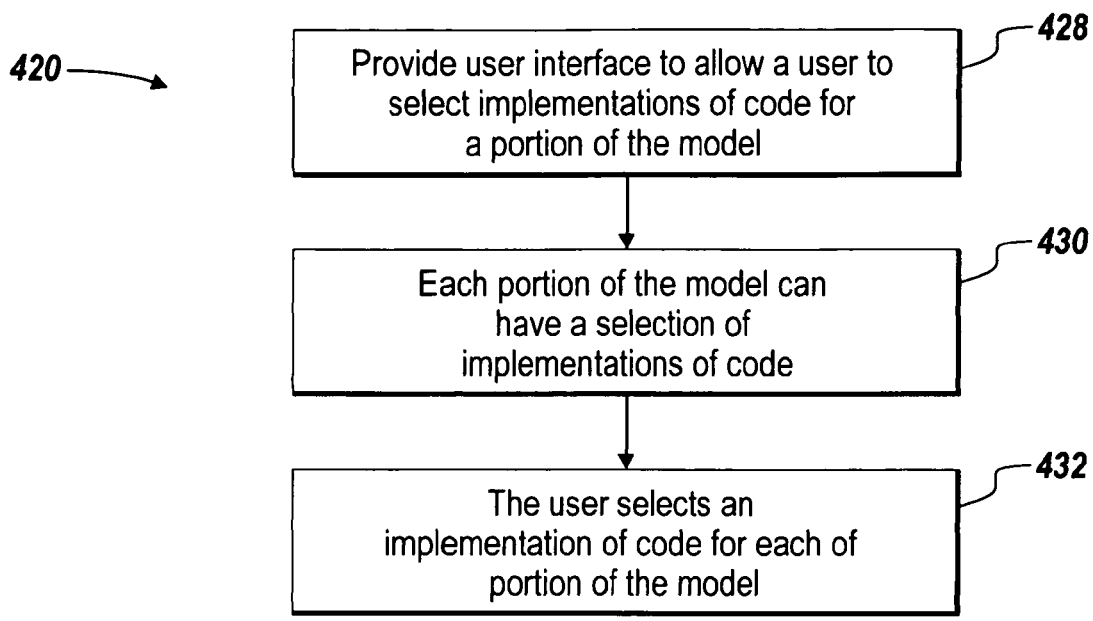
FIG. 4C is a flow diagram that provides exemplary steps for specifying implementations of code for a model.

FIG. 4C is a flow diagram that depicts an example of the steps of specifying implementations of code in more detail. Upon a decision by the user to generate code that represents a model, the user may be prompted with a user interface that allows the user to select implementations of code for each portion of the model (step 428). Prior to selecting implementations of code, the user may specify the language to be used for the code generation, the type of code and/or a target device, as discussed above. The portion of the model may represent a part of an element, an element, multiple elements algorithmic aspects, etc. Each portion of the model can have a selection of implementations of code that can be used (step 430). The user can select an implementation of code for each of the elements in the model (step 432). In some instances, the elements may have an associated default implementation of code. Once the user completes the selection of implementations of code, the code is generated from the model using the implementations, as depicted in FIG. 4A.

Figure 4D:
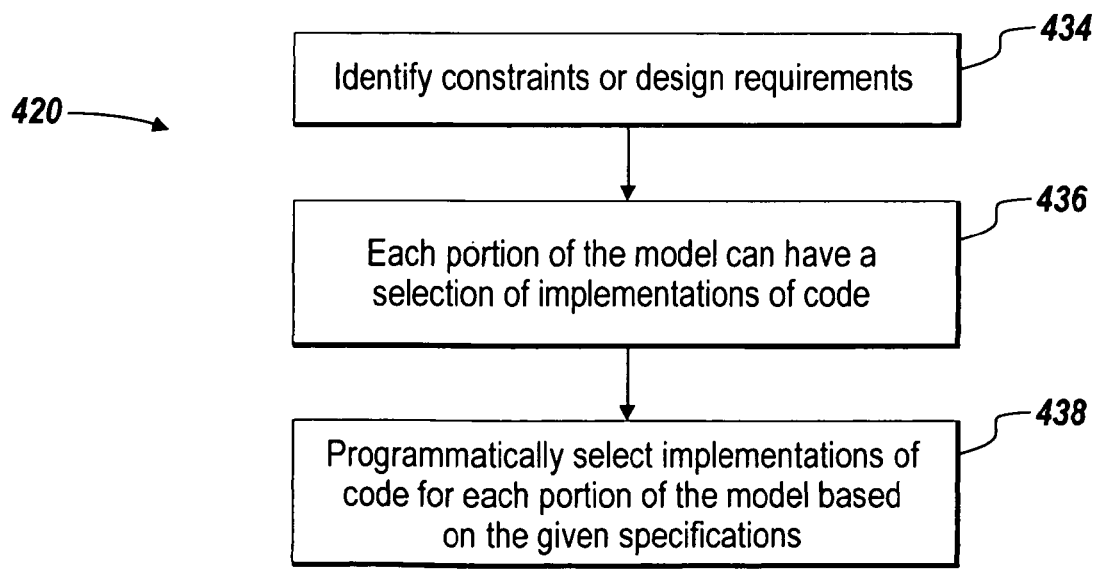
FIG. 4D is a flow diagram that provides an alternative arrangement of the steps for specifying implementations of code.

FIG. 4D is a flow diagram that depicts another example of the steps of specifying implementations of code in more detail. The user may provide constraints to the modeling environment 100 (step 434). The constraints may be a language or type of code that is to be generated, such as C, C++, JAVA™ programming language, JAVASCRIPT™ scripting language, VHDL, Verilog, etc or instrumented, non-instrumented, floating point or fixed point code. The user also may constrain the code generation to be compliant with a coding standard/guideline, such as MISRA (Motor Industry Software Reliability Association). The constraints also be an identified target device, such as an FPGA, PLC, ASIC, ASIP, etc., or may be a maximum amount or power dissipation, execution time, memory size or availability, area (e.g., an area occupied on a target device by the generated code), stack usage, etc. Each portion of the model can have a selection of implementations of code that can be used (step 436). The modeling environment 100 can programmatically select implementations of code for each portion of the model based on the constraints of the user (step 438). In this manner, the modeling environment 100 can optimally select implementations of code that meet the constraints. After the implementations of code are specified, code is generated from the model using the specified implementations, as depicted in FIG. 4A.

A user may employ the code generation process for multiple combinations of implementations of code. In this manner, a user generates code for each combination of implementations of code specified. The user can execute the code to obtain profiler information on the code to determine which combination of implementations is suitable to the user. The profiler information may include, but is not limited to an actual execution time, stack usage, memory size, etc.

In some instances, a user can specify a "model scope" for selecting implementations of code. For example, the user can specify a particular region of a model where elements in that region can all be specified to use implementations of code that are developed to accomplish the same goal. For example, the user can specify a region of the model such that portions of the model in that region use an implementation of code that increases the speed of execution. In this example, the portions of the model in the specified region each use a corresponding implementation of code that increases the speed of execution.

In some instances, a user can specify a type of element as a scope. A model may include multiple elements that perform the same function as well as elements that perform different functions. The user can specify that elements of this type use an identical implementation of code. For example, a model may include multiple gain elements that are interspersed throughout the model. The user can specify that all gain elements use the same implementation of code. Alternatively, the user can specify that only gain elements in a specified region use the same implementation of code.

Figure 5A:
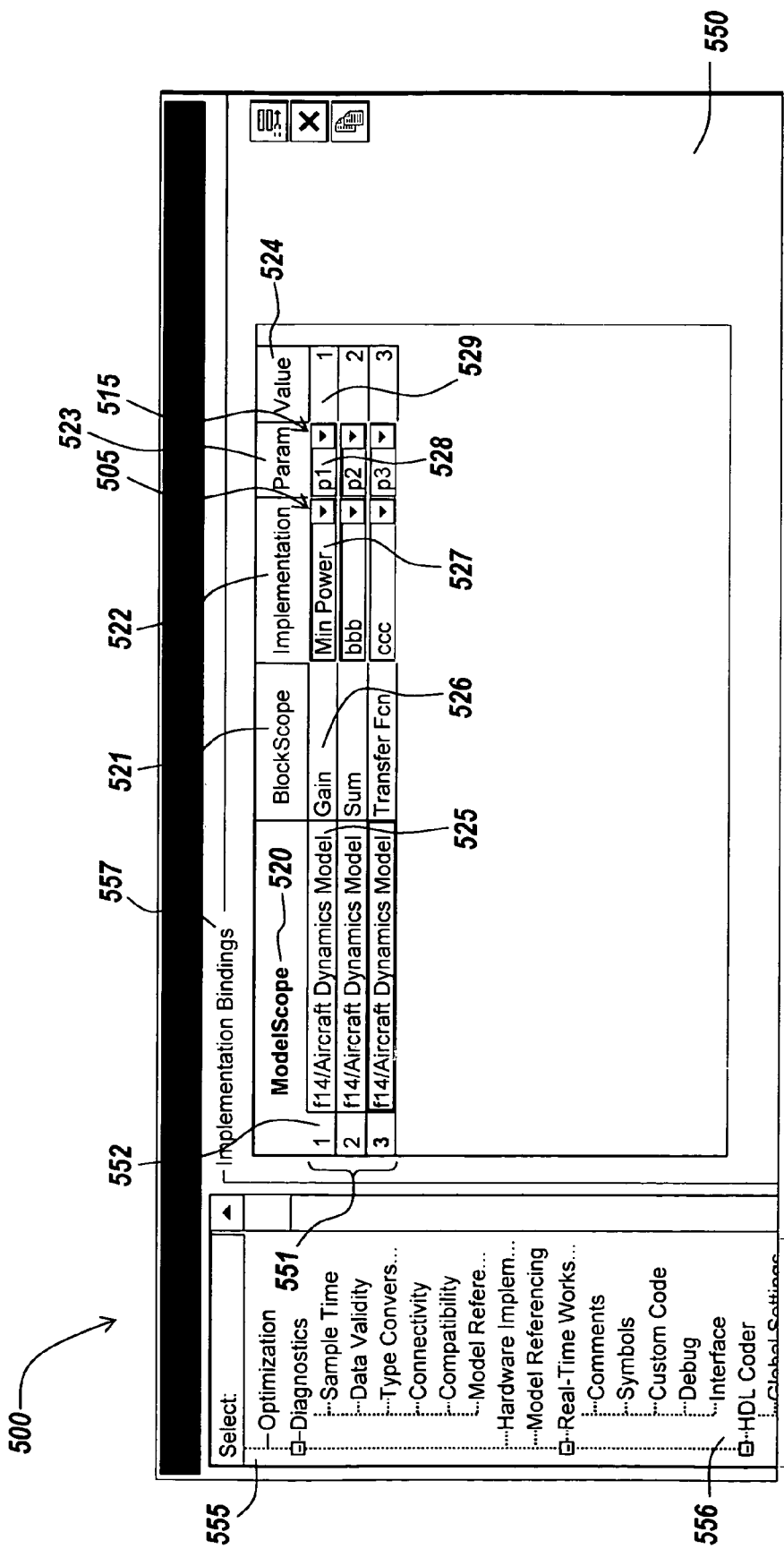
FIG. 5A illustrates an exemplary a user interface for allowing the selection implementations of code for elements of a model.

FIG. 5A is an example of a user interface 500 that may be provided for the selection implementations of code. The interface can include a pane 555 and a pane 550.

The pane 555 allows a user to specify various simulation and code generation parameters of the model. The user can select items from the pane 555 to bring up a user interface on the pane 550 for specifying the various aspects of the model. For example the user can select an item 556 to display an interface 557 for specifying implementation options for selected portions of the model on the pane 550. The interface 557 may include columns that characterize certain aspects for determining what implementation of code to use and rows that provide information for portions of the model that correspond to each column.

The pane 550 of the user interface 500 may include: a "Model Scope" column 520 that indicates the model scope of an element in the model; a "Block Scope" column 521 that indicates a type of element; an "Implementation" column 522 that allows a user to specify an implementation of code to use for code generation; a "Parameters" column 523 that allows a user to enter specific parameters for the selected implementation of code; and a "Values" column 524 that allows a user to enter specific values for the parameters of the selected implementation.

The pane 550 may also include rows 551 that list information in each column pertaining to portions of the model. For example, row 1 552 can include information pertaining to an portion of the model that includes a model scope "f14/Aircraft Dynamics Model" 525, a block scope "Gain" 526, an implementation "Min Power" 527, a parameter "P1" 528 and a value "1" 529 for the parameter "P1" 527.

The modeling environment 100 can operate to dynamically display information pertaining to each column of the pane 550. For example, for a given model scope, which can encompass the entire model, the "Block Scope" column 521 can be dynamically updated with to include portions of the model, such as elements that support code generation that are encompassed by the model scope in the "Model Scope" column 520. Once an element is selected in the "Block Scope" column 521, the "Parameters" column 523 is updated with an implementation parameter that is available for the selected implementation. The user can then enter values for each parameter in the "Values" column 524.

One skilled in the art will recognize there may be multiple parameter columns, where each column provides an implementation parameter for the corresponding implementation of code and that each parameter column may have a corresponding values column.

The user interface 500 can have drop-down list boxes or any other format type that allows a user to make selections. In one example, row 1 552 of the user interface 500 can have a drop-down list selector 505 that the user can use select to display the available implementations for a gain element in the model. In another example, the row 1 552 of the user interface 500 can have a drop-down list selector 515 that the user can select to display the implementation parameters that are available for the gain element implementation. Alternatively, all of the available implementation parameters can be displayed in multiple parameter columns.

Implementation parameters can be specific to the implementations of code that are associated with portions of a model, such as elements in the model. For example, an implementation of code for an element may include an implementation for minimizing power. The implementation of code for minimizing power may have parameters, such as, for example, a minimum power threshold and/or units (e.g., volts, watts, current, etc).

The values in the Value column 524 represent the data setting for each parameter. The user can, for example, select a "units" parameter, and subsequently enter a value for the "units" parameter under the "Values" column. In various embodiments, the modeling environment will check that the values entered are valid. For example, if the parameter requires a numerical value, but the user has entered a letter, the modeling environment may alert the user of the error.

Figure 5B:
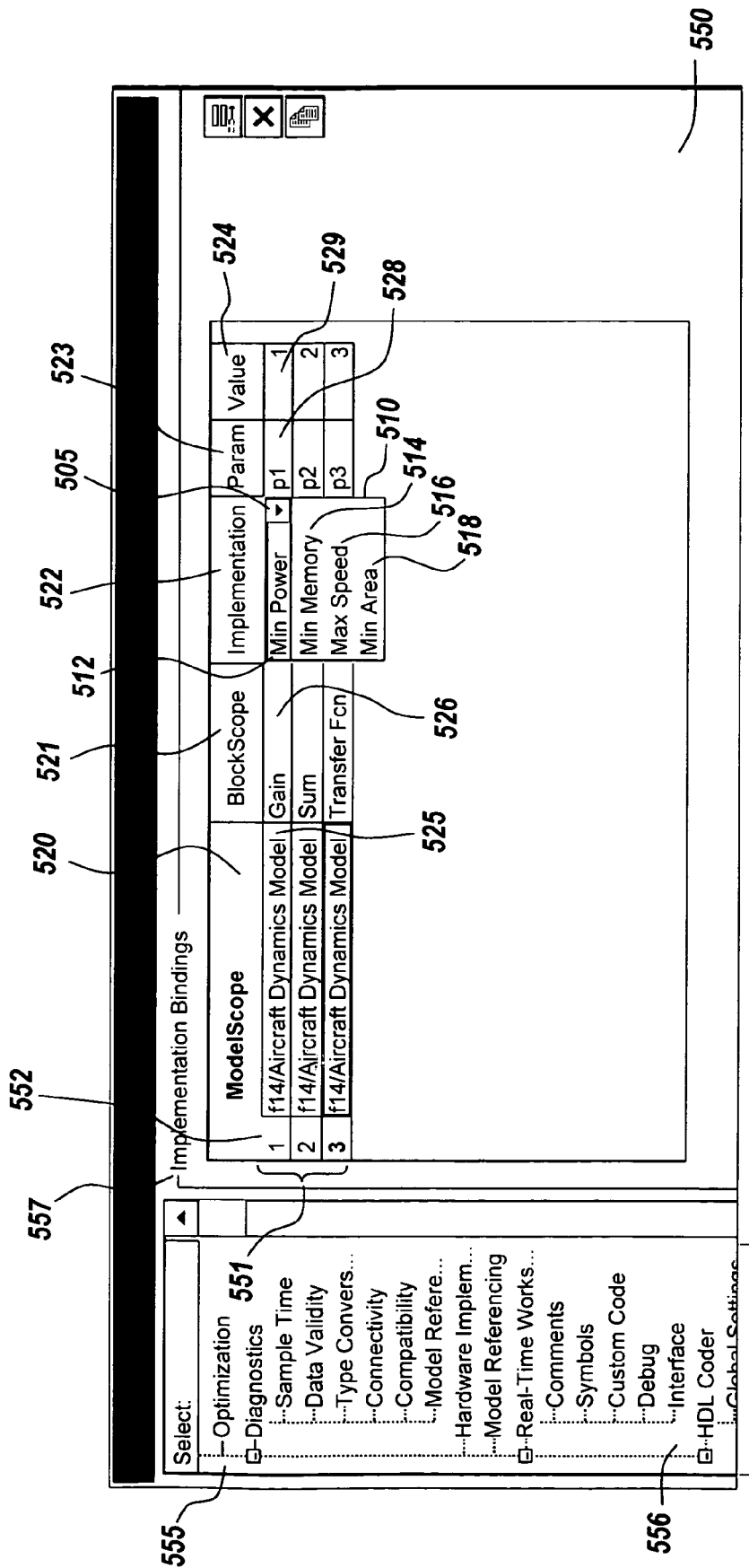
FIG. 5B depicts exemplary aspects of the user interface of FIG. 5A that can be used to select implementations of code for elements of a model.

FIG. 5B depicts another aspect of the user interface 500. For any element in the model, multiple implementations of code may be available. The user can select, with a pointing device, the drop-down list selector 510, to view a drop-down list 510, which lists implementations of code that can be specified for a "Gain" element 526 in the model scope of "f14/Aircraft Dynamics Model" 525. In this example, the drop-down list 510 lists four designations that represent implementations of code that are available to use for the Gain element 526. The designations represent an implementation of code that minimizes power dissipation 512, an implementation of code that minimizes an amount of memory 514, an implementation of code that increase the speed 516 in which the Gain element executes, and an implementation of code that reduce the physical area 518 that the Gain element will occupy if the generated code is implemented on a target device.

One skilled in the art will recognize that the user interface 500 is one example of a user interface that can allow a user to make selections for the implementations of code, implementation parameters and/or values, and that other user interface implementations can be developed. For example, a user interface can display each implementation parameter for portion of the model, such as, for example, an element, and can allow a user to enter the values for each implementation parameter, or alternatively, the user interface can allow the user to select an implementation parameters button that is associated with an element, which opens a new user interface. The new user interface can provide access to the implementation parameters for the associated element and can allow a user to edit the data values associated with the implementation parameters.

Figure 6:
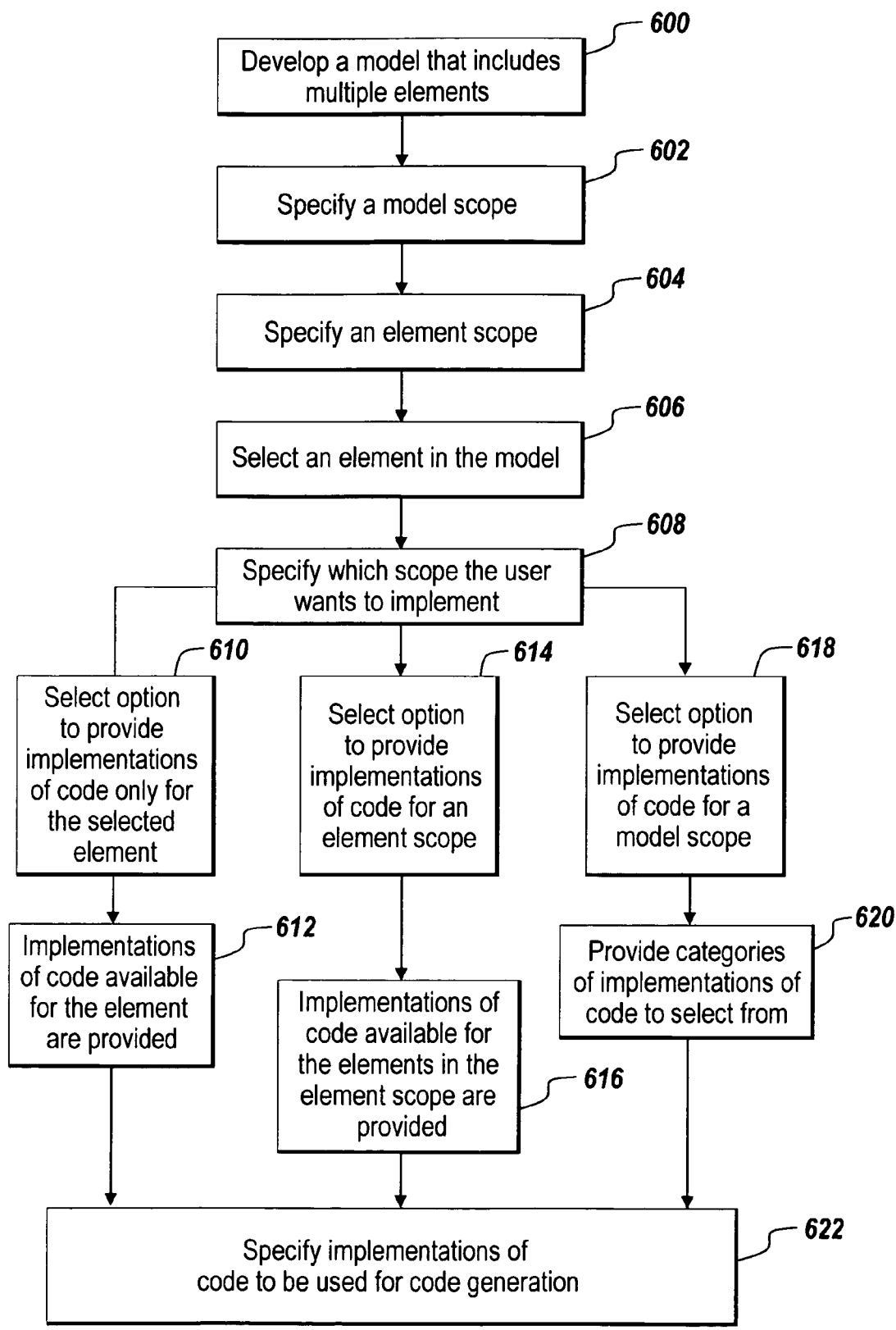
FIG. 6 is a flow diagram that illustrates exemplary steps for specifying a scope and implementations of code.
Figure 7A:
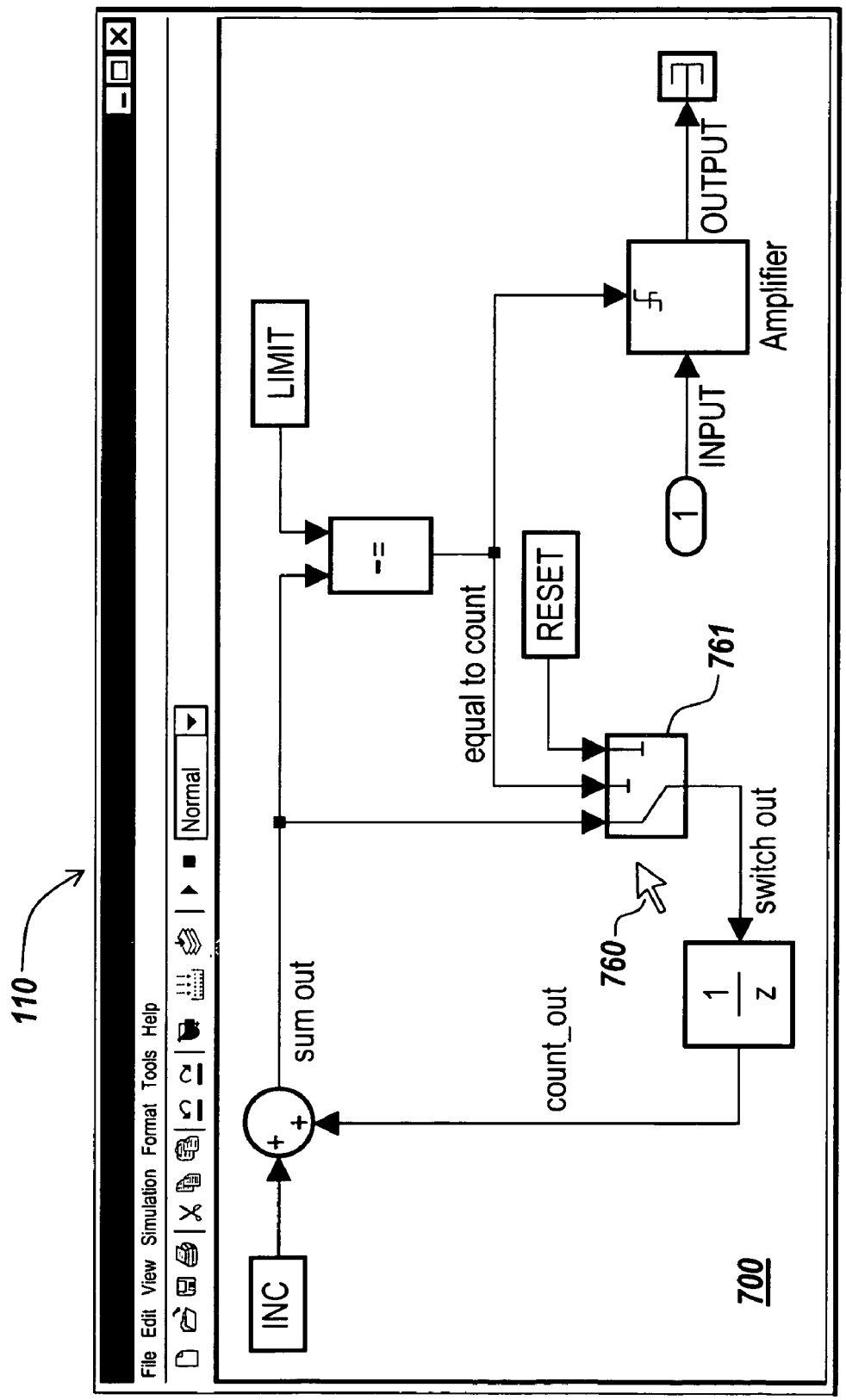
FIGS. 7A-D illustrates an exemplary model that can be developed via a modeling interface.
Figure 7B:
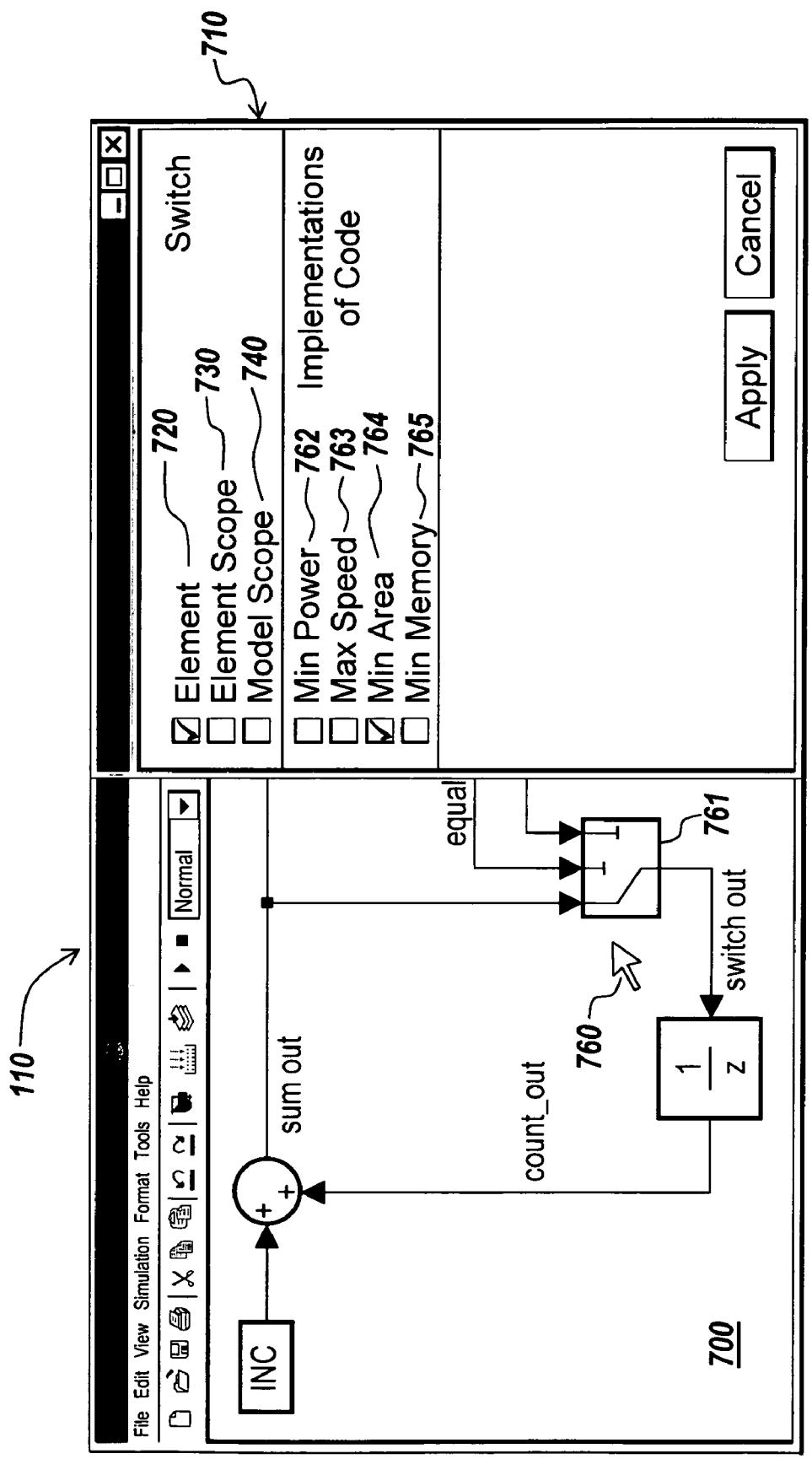
Figure 7C:
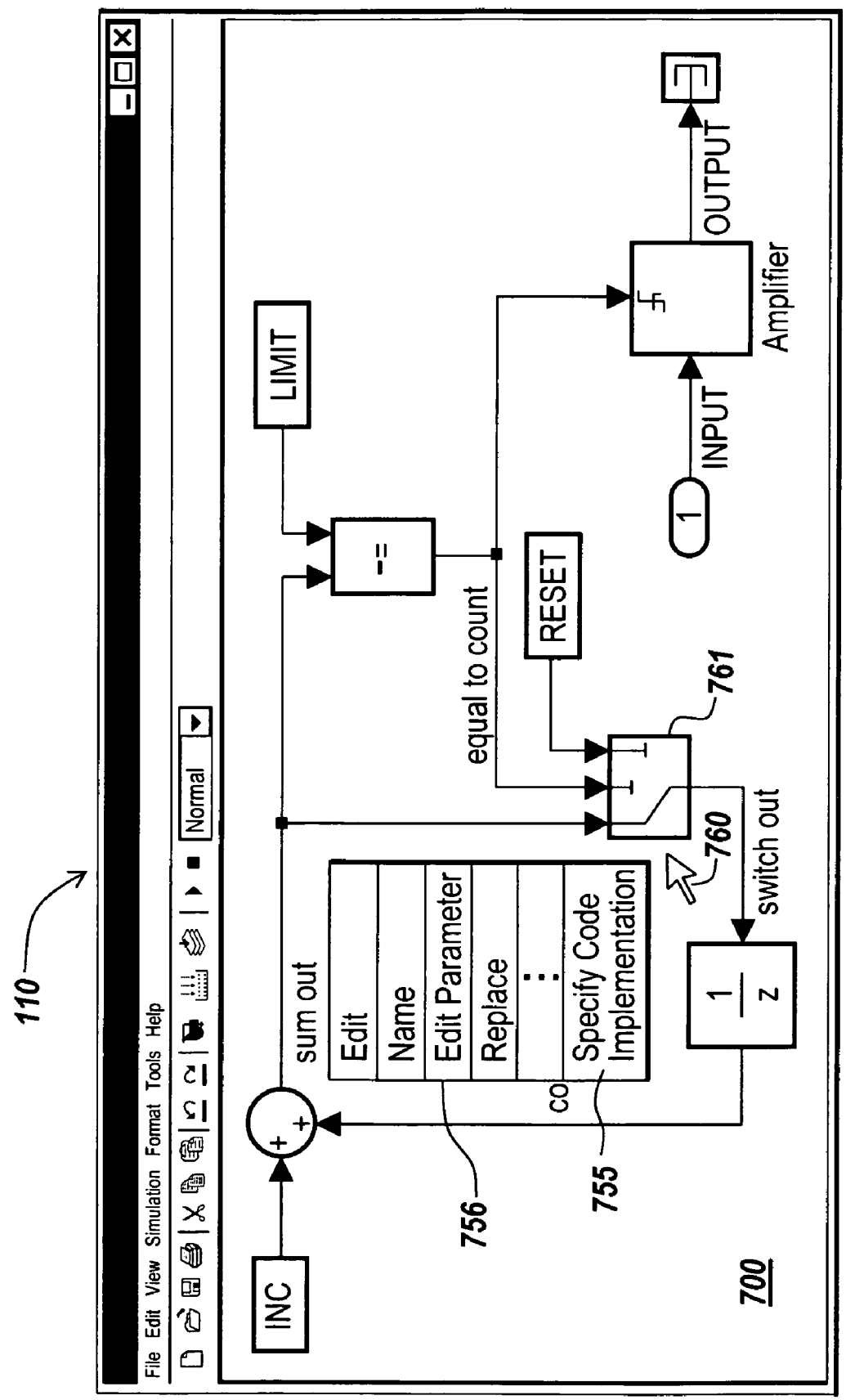
Figure 7D:
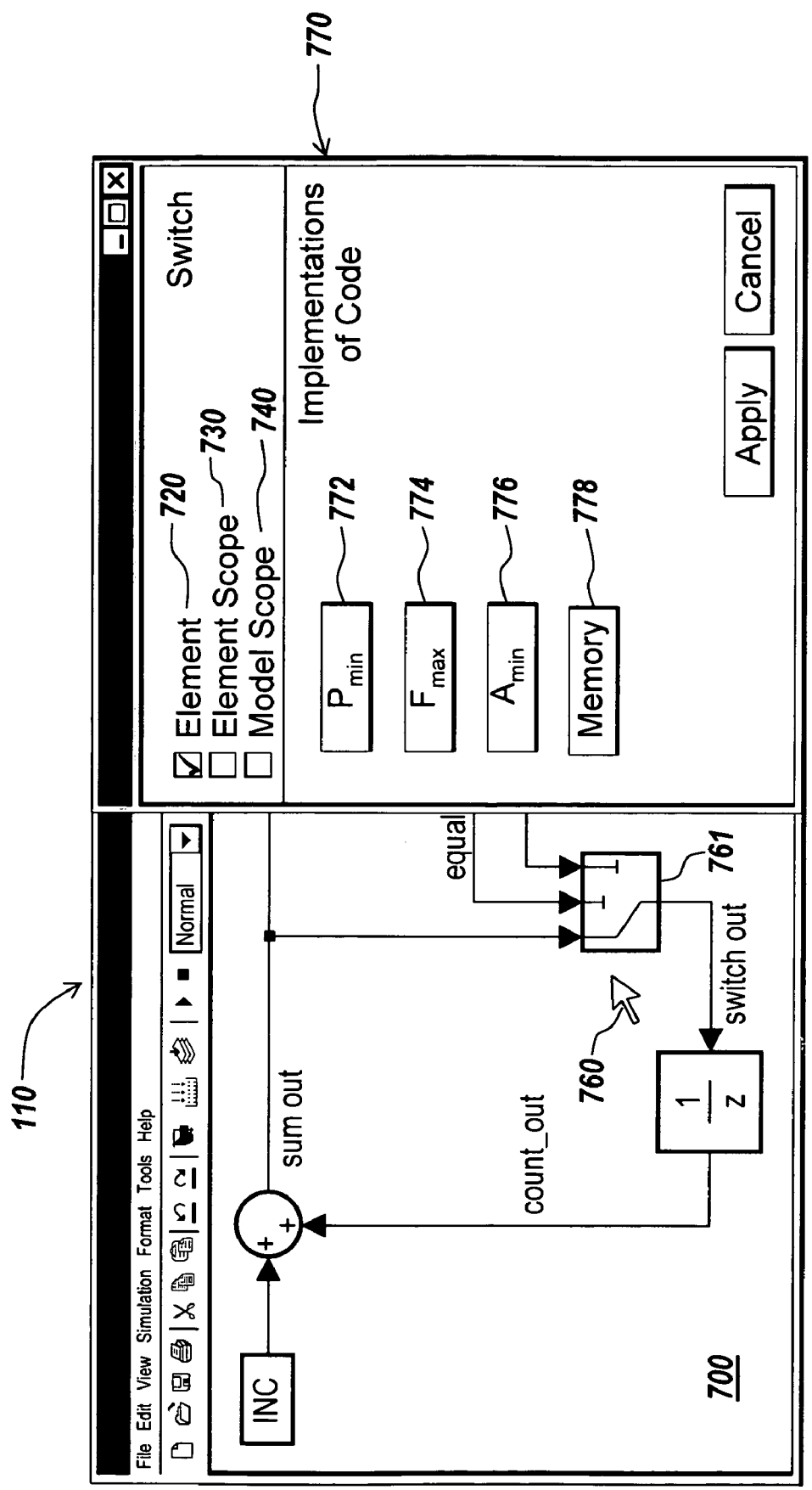

FIGS. 7A-C provide an example of a model that can be developed with the modeling interface 110 and another example of a user interface 710 for selecting implementations of code. FIG. 7D is yet another example of a user interface 770 for selecting implementations of code. FIG. 6 is a flow diagram that is discussed in relation to FIGS. 7A-D to illustrate the steps for specifying implementations of code. The user may develop a model 700 in the modeling interface 110 that includes multiple elements, as depicted in FIG. 7A (step 600). The user can specify a model scope for a region of the model that includes at least one element in the model (step 602). A model scope can be specified to include the entire model. The user may further specify an element scope that specifies a type of element in the model (step 604). The user may select an element 761 in the model that has a specified model scope and element scope (step 606). When the element 761 is selected, the modeling environment 100 may bring up the user interface 710 that includes designations that represent all of the available implementation of code for the selected element, as depicted in FIG. 7B. In the alternative, the user may right click on an element 761 and select a "Specify implementation" option 755 from a menu 756, as depicted in FIG. 7C, to display the available implementations of code for the element with the user interface 710.

The user can specify which scope the user wants to implement (step 608). For example, the user may be presented with an option 720 to select an implementation of code only the select element (step 610), in which case all available implementations of code available for the element may be provided for selection (step 612). The user may also be presented with an option 730 to select an implementation of code for an element scope that includes the selected element (step 614). In this case, implementations of code that are available for the element in the element scope are provided for selection (step 616). The user may also be provided an option 740 to select implementations of code for a model scope that includes the selected element (step 618). In this case, the user may be provided with categories of implementations of code to select from (step 620). For example, distinct implementations of code for each distinct element in the model scope may be developed for the common goal of power reduction. The user can specify that all elements in the model scope use implementations of code that correspond to implementations of code for power reduction.

Once the user has specified the scope, the user can select an implementation of code to specify that the selected implementation of code be used for code generation (step 622). The user interface 710 can include, for example an option 762 for an implementation of code that minimizes power, an option 763 for an implementation code that maximizes speed, an option 764 for an implementation that minimizes area and an option 765 for an implementation that minimizes memory use. In this example, the user selects an implementation of code to minimize area by checking the option 764.

Alternatively, the user may be provided with a user interface 770 of FIG. 7D for selecting an implementation of code. The user interface can provide the options 720, 730 and 740 as well as a designation 772 for an implementation of code that minimizes power, a designation 774 for an implementation code that maximizes speed, a designation 776 for an implementation that minimizes area and a designation 778 for an implementation that minimizes memory use. As depicted in steps 610, 614 and 618 of FIG. 6, the user can select one of the options 720, 730 or 740. The user can then use a drag-and-drop operation to select one the designations 772, 774, 776 or 778. For example, the user can specify that the switch element use the implementation of code that minimizes power by selecting the designation 772 with the mouse pointer and dragging the designation over the switch element and dropping the designation 772 on the switch element.

The implementations can be represented by icons to make identification of implementations of code easier. For example, each implementation of code that is developed to minimize memory use can be represented by the same icon. This allows a user to easily distinguish implementations of code that satisfy common performance characteristics from other implementations of code.

The modeling environment 100 may specify a default implementation of code for each portion of the model. In the case where the user desires to generate code using the default implementations of code, the user does not need to specify implementations of code and the modeling environment 100 can generate code that includes the default implementations of code. The user can, for example, specify a model scope that includes the entire model and can generate code from the model using the corresponding implementations of code.

In some instance, a user can specify a priority for implementations of code. For example, the user may include a gain element and a delay element in a model. The gain and delay elements may each have a specified implementation of code. In addition, there may be an implementation of code that encompasses both the gain and delay elements. The user may assign the highest priority to the implementations of code, such that the implementation of code that encompasses both the gain and delay elements is used for generating code. The prioritized implementations may be specified according to FIG. 4D or may be specified as a default implementation that allows the user to select a different implementation of code according to FIG. 4C.

In one embodiment, an application program interface (API) may be provided that allows a user to supply implementations of code. In this manner, the user can develop plug-ins and can extend objects, elements, or other portions of a model. The user can supply an implementation of code and specify a path to the location of the user-supplied implementation of code. When the user desires to generate code from a model that includes a portion of the model, where the user has supplied an implementation of code, the modeling environment 100 may retrieve the user-supplied implementation as one of the available implementations of code. The modeling environment 100 may allow the user to select the user-developed implementation of code.

Figure 8:
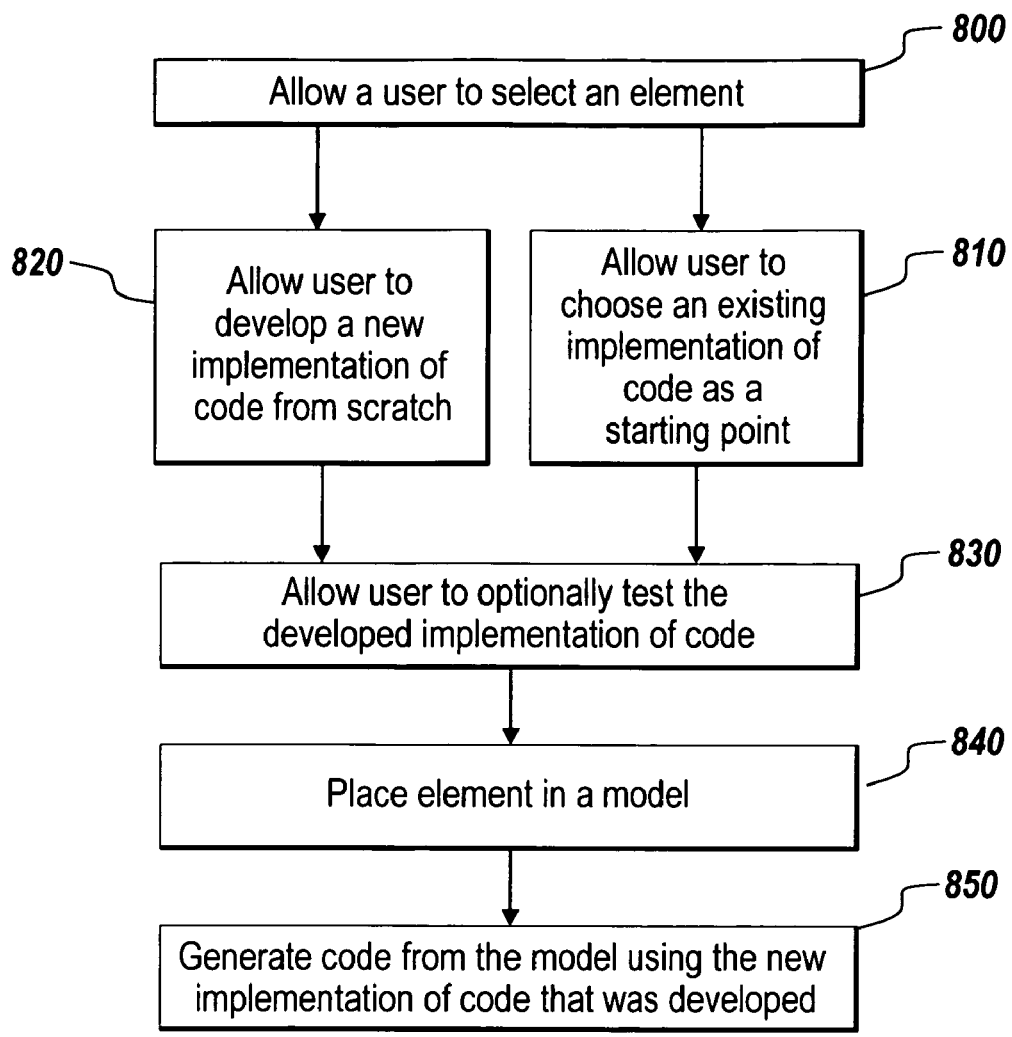
FIG. 8 illustrates exemplary steps for specifying a user-supplied implementation of code.

In one embodiment, a user may be provided with a user interface for developing user-specified implementations of code. The user interface can be the modeling interface 110, textual interface 150 or another user interface that allows a user to develop an implementation of code. FIG. 8 is a flow diagram illustrating the steps of specifying a user-developed implementation of code. The user interface can allow a user to select an element (step 800), for which the user wants to develop a user-specified implementation of code. Following the selection of an element, the user may be able to choose an existing implementation of code as a starting point for developing the user specified code (step 810). For example, the user may want to further customize an implementation of code that was developed for minimizing the physical area that the code will consume on a target device to further minimize the physical area. Alternatively, the user can develop a new implementation of code from scratch (step 820). When the implementation of code is complete, the user may optionally test the implementation of code to verify that the implementation of code functions properly (step 830). The user may then provide the element corresponding to newly developed implementation of code in a model (step 840), and subsequently, the user may generate code from the model using the newly developed implementation of code (step 850).

In some instances, after the code is generated, the user may modify the generated code. If the user modifies the code, embodiments of the present invention may record the changes or may generate an additional implementation of code. The recorded change can be employed for future code generation of models and can automatically modify the generated code to include the changes that were recorded from previous code generations.

Figure 9A:
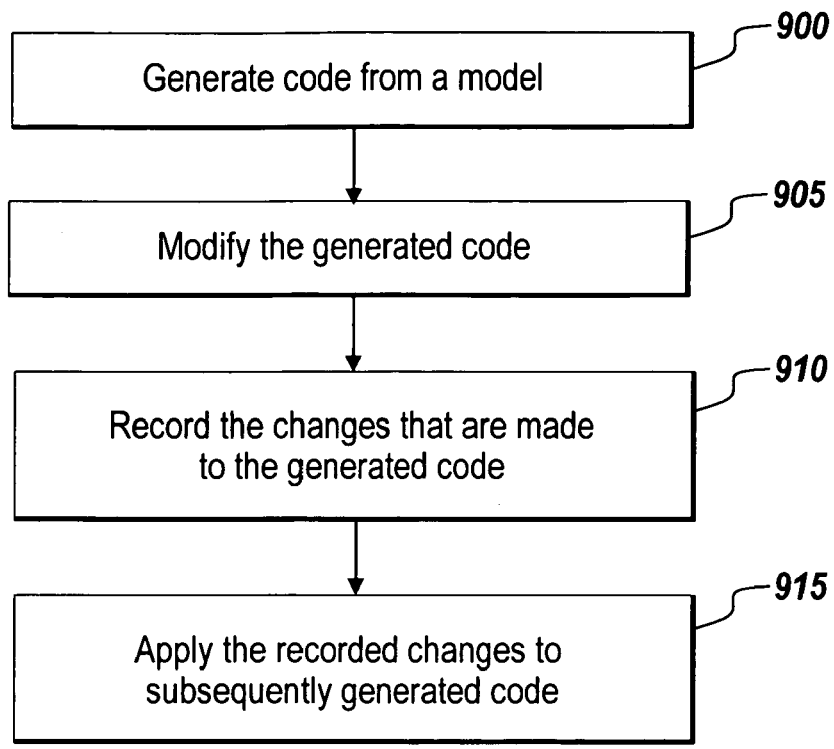
FIG. 9A illustrates exemplary steps for recording modifications to generated code.

FIG. 9A is a flow diagram that illustrates the steps for recording changes to the generated code for future code generations. A user can generate code from a model (step 900). The code can include various implementations of code that are associated with portions of a model. The user can modify the generated code (step 905). For example, the user may explicitly set each variable that is a pointer in the generated code to be NULL upon declaration. The modeling environment 100 can record the changes that are made to the generated code (step 910). After the user subsequently generates code, the modeling environment 100 can apply the recorded changes to the generated code (step 915). The recorded changes can be applied to any model that the user generates and is not limited to reiterative code generations of the same model.

Figure 9B:
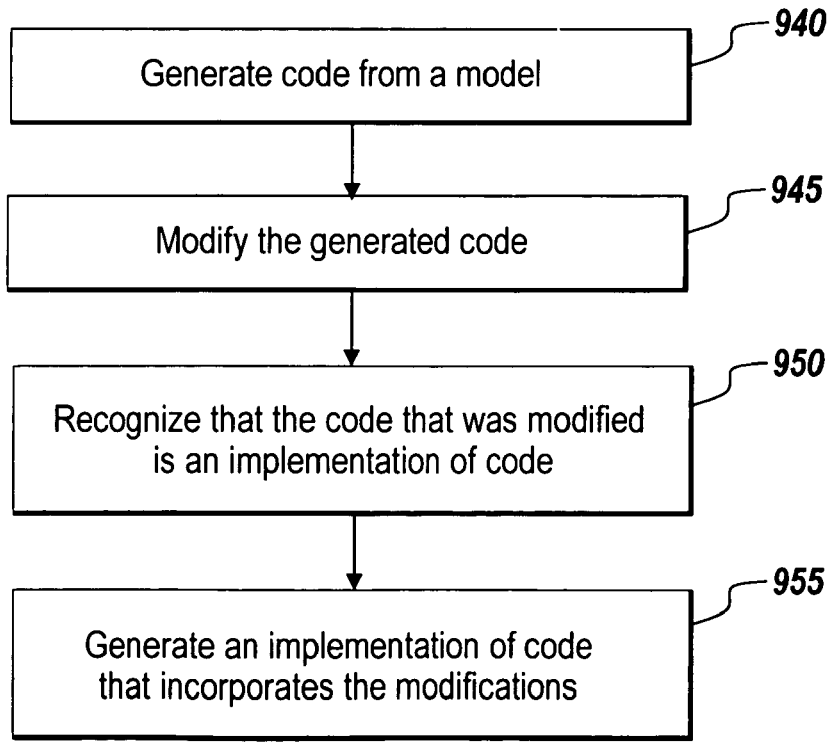
FIG. 9B illustrates exemplary steps generating additionally implementations of code based on modifications of generated code.

FIG. 9B is a flow diagram that illustrates the step of generating a new implementation of code based on modifications made to the generated code by a user. A user can generate code from a model (step 940). The code can include various implementations of code that are associated with portions of a model. The user can modify an implementation of code for a section of the generated code (step 945). For example, the user may have specified an implementation of code to minimize power dissipation of an element in the model. After the code is generated for the model, the user may decide to modify the implementation of code in the generated code. When the user modifies the code, the modeling environment 100 may recognize that the code that was modified is an implementation of code (step 950), and may generate an additional implementation of code that incorporates the modifications made by the user (step 955). The modeling environment 100 may automatically generate the additional implementation or may allow the user to decide whether the additional implementation should be generated.

In some instances a particular implementation of code may not be available to the user. In this case, the modeling environment may review the model provided by the user to determine if any modification can be made to the model to satisfy an identified constraint by the user. The modeling environment can indicate changes to the user and the changes can be incorporated into the model.

The above examples for specifying implementations of code are merely illustrative and are not meant to be limiting. One skilled in the art will recognize that other designs are possible, and that the above examples provide only a few possible designs for specifying implementations of code.

Figure 10:
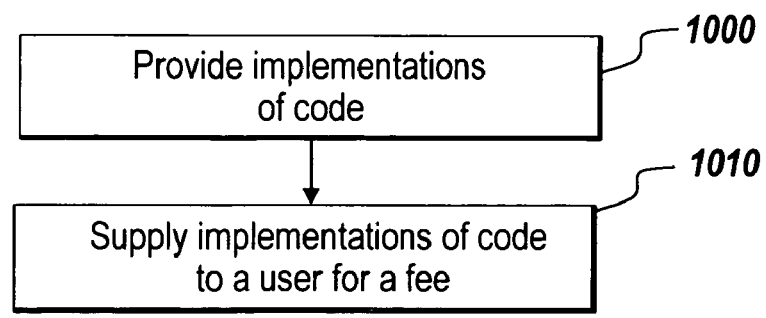
FIG. 10 is a flow diagram illustrating exemplary steps for supplying implementations of code to a user.

FIG. 10 is a flow diagram that provides an example of the steps for supplying implementations of code to a user. A vendor may provide implementations of code for elements that can be used in a model (step 1000). The implementations of code can be used by a user to generate code to represent corresponding elements in a model. The vendor can supply the implementations of code to the user for a fee (step 1010). The implementations of code that are supplied by the vendor can satisfy a performance characteristic required by a model developed by the user. Additionally, a vendor may receive requests from users to develop an implementation of code for a user-specific design. The vendor can develop the implementation of code and provide it the user for a fee.

The present invention may be provided as one or more programs readable by a computing device embodied on or in one or more mediums. The mediums may be, but are not limited to a hard disk, a compact disc, a digital versatile disc, a flash memory card, a PROM (Programmable Read Only Memory), a RAM (Random Access Memory), a ROM (Read Only Memory), a MRAM (magnetoresistive random-access memory), a magnetic tape, or even the genome in a cell nucleus. In general, the computer-readable programs may be implemented in any programming language. Some examples of languages that can be used include Python, C, C++, C#, or JAVA. Further, the computer readable programs can be implemented in a hardware description language such as Verilog or VHDL, or any other language that allows prescribing computation such as, for example, DNA (Deoxyribonucleic acid). The software programs may be stored on or in one or more mediums as object code.

Certain embodiments of the present invention are described above. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a computing system, a computer-implemented method comprising:
   with the computing system:
   inserting a plurality of elements into the model;
   specifying a scope for at least a subset of the plurality of elements;
   identifying a first implementation of code that corresponds to the first portion of a model, the first portion of the model being a subset of the plurality of elements that are encompassed by the scope;
   identifying a second implementation of code that corresponds to the first portion of the model;
   specifying a performance characteristic for an implementation of code that corresponds to the first portion of the model, the performance characteristic being one of or a weighted combination of power reduction, area reduction, memory usage reduction, execution time reduction, stack usage reduction or conformance with a coding standard;
   selecting one of the first implementation or the second implementation based on the specified performance characteristic; and
   generating code for the model, wherein a section of code that corresponds to the first portion of the model employs the selected one of the first or second implementations of code.

2. The method of claim 1, wherein a user specifies the performance characteristic.

3. The method of claim 2, wherein the user specifies the performance characteristic via an application program interface (API).

4. The method of claim 2, wherein the method further comprises:
   receiving data to customize the selected implementation of code.

5. The method of claim 4, wherein the data is one of a parameter or data value.

6. The method of claim 1, wherein the generated code is one of a programming language or a hardware description language.

7. The method of claim 1, wherein the method further comprises:
   specifying the first implementation of code as a default implementation for the generating of code for the first portion of the model.

8. The method of claim 1, wherein the first implementation of code is a user-supplied implementation of code.

9. The method of claim 1, wherein the method further comprises:
   identifying a targeted device that is capable of implementing the generated code; and
   sending at least a portion of the generated code to the targeted device.

10. The method of claim 1, wherein the model is a graphical model.

11. The method of claim 1, wherein the code generated is a hardware description language representation of the model.

12. The method of claim 1, wherein the first implementation of code is an intermediate representation.

13. The method of claim 1, wherein the first implementation of code is a template.

14. A non-transitory medium for use on a computing device, the medium holding instructions executable using the computing device, the instructions for performing the steps of:
   identifying a first implementation of code that corresponds to a first portion of a model;
   identifying a second implementation of code that corresponds to the first portion of the model;
   specifying a performance characteristic for an implementation of code that corresponds to the first portion of the model, the performance characteristic being one of or a weighted combination of power reduction, area reduction, memory usage reduction, execution time reduction, stack usage reduction or conformance with coding standards;

selecting the first implementation or the second implementation based on the specified performance characteristic; and generating code for the model, wherein a section of code that corresponds to the first portion of the model employs the selected one of the first or second implementations of code;

identifying a targeted device that is capable of implementing the generated code; and identifying a selection of implementations of code that are capable of being used on the targeted device, the selection comprising the first and second implementations.

15. The non-transitory medium of claim 14, wherein the instructions further perform the step of:

receiving a selection, from a user or a program, the selection used for specifying the performance characteristic.

16. The non-transitory medium of claim 14, wherein the model is a graphical model.

17. The non-transitory medium of claim 14, wherein the code generated is a hardware description language representation of the model.

18. In a computing device, a computer-implemented method comprising:

with the computing device;

inserting a plurality of elements into the model;

specifying a scope for at least a subset of the plurality of elements;

identifying a first implementation of code that corresponds to the first portion of the model, the first portion of the model being a subset of the plurality of elements that are encompassed by the scope;

identifying a second implementation of code that corresponds to the first portion of the model;

selecting, programmatically, one of the first or second implementations of code based on an identified constraint; and generating code for the model, wherein a section of code that corresponds to the first portion of the model employs one of the automatically selected first or second implementations of code.

19. The method of claim 18, wherein the method further comprises:

receiving the identified constraint from a user.

20. The method of claim 18, wherein the first implementation of code is supplied by a user.

21. A non-transitory medium for use on a computing device, the medium holding instructions executable using the computing device, the instructions for:

inserting a plurality of elements into the model;

specifying a scope for at least a subset of the plurality of elements;

identifying a first implementation of code that corresponds to the first portion of the model, the first portion of the model being a subset of the plurality of elements that are encompassed by the scope;

identifying a second implementation of code that corresponds to the first portion of the model;

selecting, programmatically, one of the first or second implementations of code based on an identified constraint; and generating code for the model, wherein a section of code that corresponds to the first portion of the model employs one of the automatically selected first or second implementations of code.

* * * * *